(12) United States Patent
Gilo et al.

(10) Patent No.: US 11,573,371 B2
(45) Date of Patent: Feb. 7, 2023

(54) LIGHTGUIDE OPTICAL ELEMENT FOR POLARIZATION SCRAMBLING

(71) Applicant: Lumus Ltd., Ness Ziona (IL)

(72) Inventors: Motke Gilo, Ness Ziona (IL); Tsion Eisenfeld, Ashkelon (IL); Yochay Danziger, Kfar Vradim (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 17/312,443

(22) PCT Filed: Nov. 10, 2020

(86) PCT No.: PCT/IL2020/051166
§ 371 (c)(1),
(2) Date: Jun. 10, 2021

(87) PCT Pub. No.: WO2021/105978
PCT Pub. Date: Jun. 3, 2021

(65) Prior Publication Data
US 2022/0019018 A1    Jan. 20, 2022

(30) Foreign Application Priority Data
Nov. 27, 2019   (IL) .......................................... 270991

(51) Int. Cl.
*G02B 6/10* (2006.01)
*G02B 6/00* (2006.01)
(Continued)

(52) U.S. Cl.
CPC .............. *G02B 6/105* (2013.01); *G02B 1/115* (2013.01); *G02B 6/00* (2013.01); *G02B 6/2733* (2013.01); *G02B 6/2766* (2013.01); *G02F 1/0139* (2021.01)

(58) Field of Classification Search
CPC .... G02B 1/115; G02B 6/2766; G02B 6/2733; G02B 6/105; G02F 1/0139
See application file for complete search history.

(56) References Cited

U.S. PATENT DOCUMENTS 3,829,197 A  *  8/1974  Thelen ................... G02B 1/115
                                                    359/588
5,430,505 A      7/1995  Katz
(Continued)

FOREIGN PATENT DOCUMENTS

| JP | 1996313843 | 11/1996 |
| JP | 2012-037761 U | 2/2012 |
| WO | WO2015012280 | 3/2017 |

OTHER PUBLICATIONS

Mukawa et al. A full-color eyewear display using planar waveguides with reflection volume holograms. Journal of The Society for Information Display—J Soc Inf Disp. Mar. 17, 2009. 10.1889/JSID17.3.185-187 Mar. 31, 2009 (Mar. 31, 2009) pp. 285-287.

*Primary Examiner* — Sung H Pak
(74) *Attorney, Agent, or Firm* — Mark M. Friedman (57) ABSTRACT

A lightguide optical element (LOE) configured for polarization scrambling is provided. The LOE includes a transparent substrate having a first refractive index, the substrate having a pair of parallel external surfaces configured to propagate light within the LOE through total internal reflection (TIR), and a plurality of mutually parallel partially reflective internal surfaces, those being non-parallel to the pair of parallel external surfaces and configured to couple out said light to a viewer. The LOE further includes a first coating on at least one external surface of the substrate, the first coating being of a coating material having a second refractive index higher than the first refractive index; The LOE further includes an antireflective (AR) coating on at least one external surface of the substrate over the first coating.

7 Claims, 13 Drawing Sheets

(51) Int. Cl.
  *G02B 6/27* (2006.01)
  *G02F 1/01* (2006.01)
  *G02B 1/115* (2015.01)

(56) References Cited

U.S. PATENT DOCUMENTS

| | | |
|---|---|---|
| 5,712,694 A | 1/1998 | Taira et al. |
| 6,154,321 A | 11/2000 | Melville et al. |
| 6,231,992 B1 | 5/2001 | Niebauer et al. |
| 6,239,092 B1 | 5/2001 | Papasso et al. |
| 6,404,550 B1 | 6/2002 | Yajima |
| 6,542,307 B2 | 4/2003 | Gleckman et al. |
| 6,671,100 B1 | 12/2003 | McRuer |
| 8,187,481 B1 | 5/2012 | Hobbs |
| 8,479,119 B2 | 7/2013 | Hörentrup et al. |
| 8,665,178 B1 | 3/2014 | Wang |
| 10,222,535 B2 | 3/2019 | Remhof et al. |
| 2003/0165017 A1 | 9/2003 | Amitai |
| 2004/0032660 A1 | 2/2004 | Amitai |
| 2004/0033528 A1 | 2/2004 | Amitai |
| 2005/0024849 A1 | 2/2005 | Parker et al. |
| 2005/0078388 A1 | 4/2005 | Amitai |
| 2005/0083592 A1 | 4/2005 | Amitai |
| 2005/0180687 A1 | 8/2005 | Amitai |
| 2007/0091445 A1 | 4/2007 | Amitai |
| 2007/0097513 A1 | 5/2007 | Amitai |
| 2007/0155277 A1 | 7/2007 | Amitai |
| 2007/0159673 A1* | 7/2007 | Freeman .............. G02B 6/0028 359/19 |
| 2008/0025667 A1 | 1/2008 | Amitai |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2010/0201953 A1 | 8/2010 | Freeman |
| 2010/0214635 A1 | 8/2010 | Sasaki et al. |
| 2011/0096566 A1 | 4/2011 | Tsai et al. |
| 2011/0109880 A1 | 5/2011 | Nummela |
| 2012/0179369 A1 | 7/2012 | Lapidot et al. |
| 2013/0135749 A1 | 5/2013 | Akutsu et al. |
| 2013/0208362 A1 | 8/2013 | Bohn et al. |
| 2013/0229717 A1 | 9/2013 | Amitai |
| 2013/0276960 A1 | 10/2013 | Amitai |
| 2013/0279017 A1 | 10/2013 | Amitai |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Kang et al. |
| 2014/0019801 A1 | 7/2014 | Lamb |
| 2015/0138451 A1 | 5/2015 | Amitai |
| 2015/0182348 A1 | 7/2015 | Siegal et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0277127 A1 | 10/2015 | Amitai |
| 2015/0289762 A1 | 10/2015 | Popovich et al. |
| 2015/0293360 A1 | 10/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0341964 A1 | 11/2016 | Amitai |
| 2016/0349518 A1 | 12/2016 | Amitai et al. |
| 2017/0045744 A1 | 2/2017 | Amitai |
| 2017/0052376 A1 | 2/2017 | Amitai |
| 2017/0052377 A1 | 2/2017 | Amitai |
| 2017/0336636 A1 | 11/2017 | Amitai et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger et al. |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |

(56) References Cited

U.S. PATENT DOCUMENTS

| | | |
|---|---|---|
| 2022/0019018 A1 | 1/2022 | Gilo et al. |
| 2022/0030205 A1 | 1/2022 | Danziger |
| 2022/0043272 A1 | 2/2022 | Amitai |
| 2022/0057643 A1 | 2/2022 | Eisenfeld et al. |
| 2022/0075194 A1 | 3/2022 | Ronen et al. |
| 2022/0043269 A1 | 10/2022 | Maziel |

* cited by examiner

LIGHTGUIDE OPTICAL ELEMENT FOR POLARIZATION SCRAMBLING

TECHNICAL FIELD

The presently disclosed subject matter relates to a lightguide optical element, and, more particularly, to a lightguide optical element configured for polarization scrambling.

BACKGROUND

The present invention relates to light-guide compact collimating optical devices (LCCDs) and to optical systems which include one or more of these devices. The term "light-guide" refers to any light-transmitting body, preferably light-transmitting, solid bodies, also known as optical substrates. One of the important applications for compact optical devices is in the field of Head Mounted Displays (HMD), wherein an optical module serves both as a reflecting optical element and a combiner, in which a two-dimensional image is imaged to infinity and reflected into the eye of an observer. The image can be obtained directly from a spatial light modulator (SLM), such as a cathode ray tube (CRT), a liquid crystal display (LCD), liquid crystal on silicone (LCOS) module, an organic light emitting diode array (OLED), micro-LED a scanning source or similar devices, or indirectly, by means of a relay lens or an optical fiber bundle. The image comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. This optical module will be referred to herein as a Lightguide Optical Element ("LOE").

Typically, the LOE is positioned in front of the viewer's eye. A collimated beam of light rays entering the LOE is reflected between the parallel surfaces by total internal reflection ("TIR"). Coated facets partially reflect the rays towards the viewer's eye.

Typically, the light entering the LOE is either S-polarized or P-polarized. The coatings on the facets reflect light having the same polarization state. Since there is only one polarization state involved, the TIR reflection will maintain this polarization state. However, in applications where the light entering the LOE is unpolarized, every TIR reflection causes a phase shift which will change the polarization state of some of the rays. This in turn can lead to a corresponding change in the amount of light reflected by the facets, which is undesirable.

GENERAL DESCRIPTION

According to one aspect of the presently disclosed subject matter there is provided a lightguide optical element (LOE) configured for polarization scrambling including: a transparent substrate having a first refractive index, the substrate including a pair of parallel external surfaces configured to propagate light within the LOE through total internal reflection (TIR), and a plurality of mutually parallel partially reflective internal surfaces, the plurality of mutually parallel partially reflective internal surfaces being non-parallel to the pair of parallel external surfaces and configured to couple out the light to a viewer; a first coating having a thickness between 100 nm and 10 microns on at least one external surface of the substrate, the first coating including a coating material having a second refractive index higher than the first refractive index; and an antireflective (AR) coating on at least one external surface of the substrate over the first coating.

In some embodiments the first coating is configured to increase a phase shift between s-polarized and p-polarized components of light incident at angles above a TIR cutoff angle for the substrate, the light having a wavelength between 400 nm and 1300 nm.

In some embodiments the AR coating is configured to reduce or eliminate reflections of light entering the LOE at angles of incidence between 0° and 50°.

In some embodiments the AR coating is configured to reduce reflections of light entering the LOE at predetermined angles to between 0.3% and 10% reflected light.

In some embodiments the first coating includes a high index dielectric material.

In some embodiments the first coating includes a material selected from the group consisting of $TiO_2$, $Si_3N_4$ and ZnS.

In some embodiments the AR coating includes one or more layers of at least one coating material selected from the group consisting of $SiO_2$, $HfO_2$, $TiO_2$, $MgF_2$ and $Al_2O_3$.

In some embodiments the AR coating includes one or more layers of at least one material having a refractive index in the range of 1.35 to 2.5.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

As used herein, the term 'phase shift' refers to the difference between the phase of the S-polarized rays and P-polarized rays.

Figure 1:
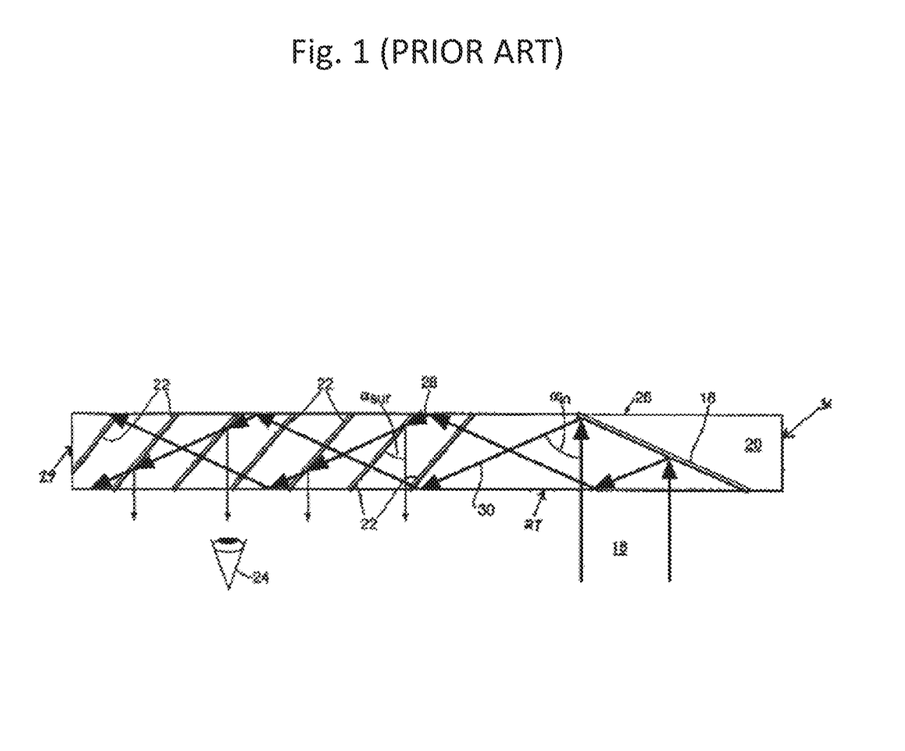
FIG. 1 illustrates a generalized schematic diagram of a LOE according to the prior art.

Bearing this in mind, attention is drawn to FIG. 1 illustrating a generalized schematic diagram of a LOE according to the prior art. The LOE comprises a substrate 34 that has a pair of parallel external surfaces 26, 27, and a non-parallel set of mutually parallel partially reflective internal surfaces ("facets") 22. The partially reflective property of facets 22 is achieved via a coating applied to the facets. Light rays 18 representing an image is coupled into the LOE and propagates within the LOE via TIR between surfaces 26, 27, and are eventually reflected out by facets 22 towards the eye 24 of a viewer.

Figure 2:
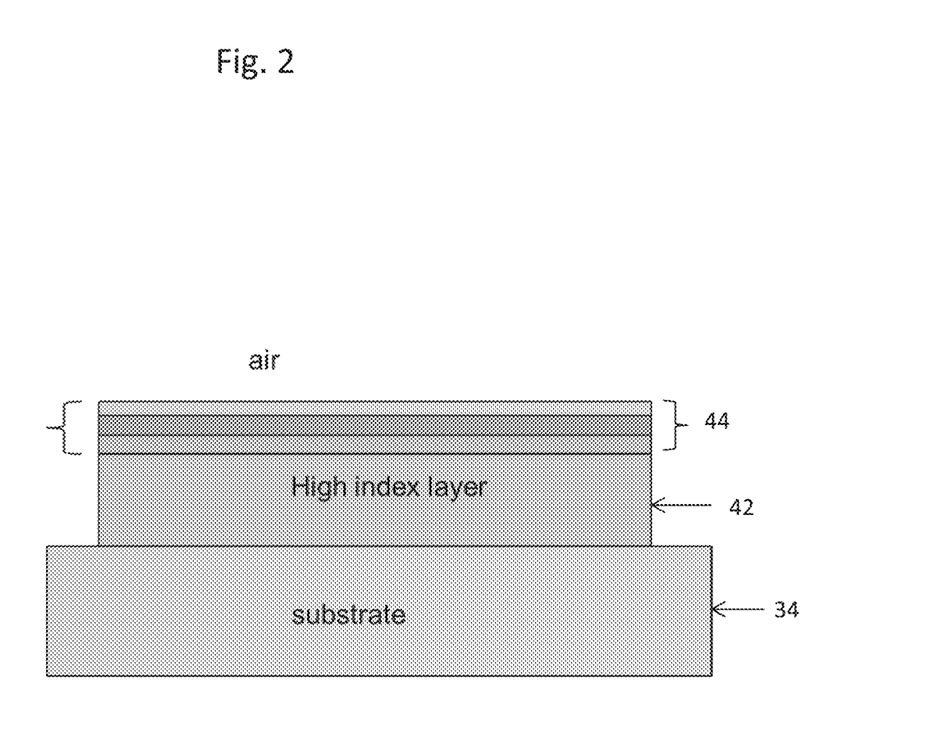
FIG. 2 illustrates a generalized schematic diagram of an LOE according to certain embodiments of the presently disclosed subject matter.

FIG. 2 illustrates a generalized schematic diagram of an LOE according to certain embodiments of the presently disclosed subject matter. In this case, the LOE is intended to receive and couple out unpolarized light. As in the prior art LOE's, the LOE of the present invention is comprised of a transparent substrate 34 having a refractive index (denoted herein as "n") higher than air. The substrate comprises a pair of parallel external surfaces 26, 27 configured to propagate light within the LOE through TIR. Substrate 34 further comprises a plurality of mutually parallel partially reflective internal surfaces ("facets") 22 configured to couple out the light to a viewer. The facets are non-parallel to the external surfaces 26, 27. For example, they may be inclined relative to the pair of external surfaces.

The LOE further includes a polarization scrambling coating 42 applied to at least one of surfaces 26, 27. Coating 42 is comprised of a coating material having a refractive index, which is higher than the first refractive index of substrate 34. The polarization scrambling coating 42 is applied to at least one of the external surfaces 26, 27, or a portion thereof, in a thickness greater than 100 nm and up to about 10 microns. In some cases, the polarization scrambling coating 42 can be applied to both parallel external surfaces. The polarization scrambling coating 42 applied to the external surfaces of the substrate increases the phase difference slope between the S-polarized and P-polarized light rays entering the substrate and reflecting off the inside of the external coated surface. This is for angles of incidence above the Total Internal Reflection (TIR) angle. The phase difference slope is the amount of change of the phase shift difference for a small change of the wavelength.

Polarization scrambling coating 42 can be selected according to predetermined design requirements based on the expected range of wavelengths of light entering the LOE and the expected range of angles at which the light will enter, for instance angles in the TIR region above 42° for BK7 glass. After a few reflections, the S-polarized light and P-polarized light propagating within the LOE will become greatly phase shifted with respect to one another, essentially maintaining the light rays' unpolarized state. According to this invention, the facets 22 within the LOE are also coated with a partially reflective coating designed for unpolarized light. These coated facets reflect the unpolarized light towards the viewer as designed.

In exemplary embodiments, polarization scrambling coating 42 is applied in a thickness of between 300 nm-10000 nm, and more preferably between 300 nm-500 nm, and even more preferably between 300 nm-1000 nm.

Preferably, polarization scrambling coating 42 is comprised of a high index dielectric material such as $TiO_2$ (n≈2.2-2.45), $Si_3N_4$, (n≈2.0), ZnS (n≈2.2-2.4) or suitable equivalents. By "high index" it is meant a refractive index higher than of the substrate and preferably at least 2. Preferably, coating 42 is configured to increase the phase shift slope of light having a wavelength between 400 nm and 1300 nm, and more preferably between 400 nm and 750 nm, upon reflection off of an external surface of the substrate.

The LOE further includes an anti-reflective (AR) coating 44 applied to at least one external surface of the substrate on top of coating 42. The AR coating 44 applied on top of the polarization scrambling coating 42 reduces or eliminates reflections of light entering the LOE at given angles, thus providing for high transmittance of these light rays and allowing the viewer to see the outside world through the LOE. In an exemplary embodiment, the AR coating is configured to reduce or eliminate reflections of light rays hitting the surface at substantially "normal" incidence angles, e.g. angles in the range of 0°-50°. Preferably the AR coating reduces reflections of light entering the LOE at predetermined angles to between 0.3% and 10% reflected light.

It should be noted that the polarization scrambling coating 42 increases the reflections of the substrate at normal incidence from about 5% (for a substrate with n=1.6) to about 18% average in the visible spectrum (430 nm-660 nm). Thus, the AR coating 44 is required to reduce the reflection and also to maintain the depolarization properties induced by the polarization scrambling coating 42. These requirements increase the design complexity of the AR coating 44.

Preferably, AR coating 44 is comprised of layers of coating materials having a refractive index in the range of 1.35 to 2.5. Preferably, the coating includes one or more high refractive index materials, one or more low refractive index materials, and one or more medium (i.e. between the high and the low) refractive index materials. In exemplary embodiments, AR coating 44 can be comprised of layers of one or more of $SiO_2$ (n≈1.45-1.47), $HfO_2$ (n≈2.0-2.1), $TiO_2$ (n≈2.2-2.45), $MgF_2$ (n≈1.35-1.37) and/or $Al_2O_3$ (n≈1.63-1.68).

It should be noted that FIG. 2 is not drawn to scale, and in reality the thickness of substrate 34 is typically several orders of magnitude greater than that of coatings 42, 44.

Figure 3:
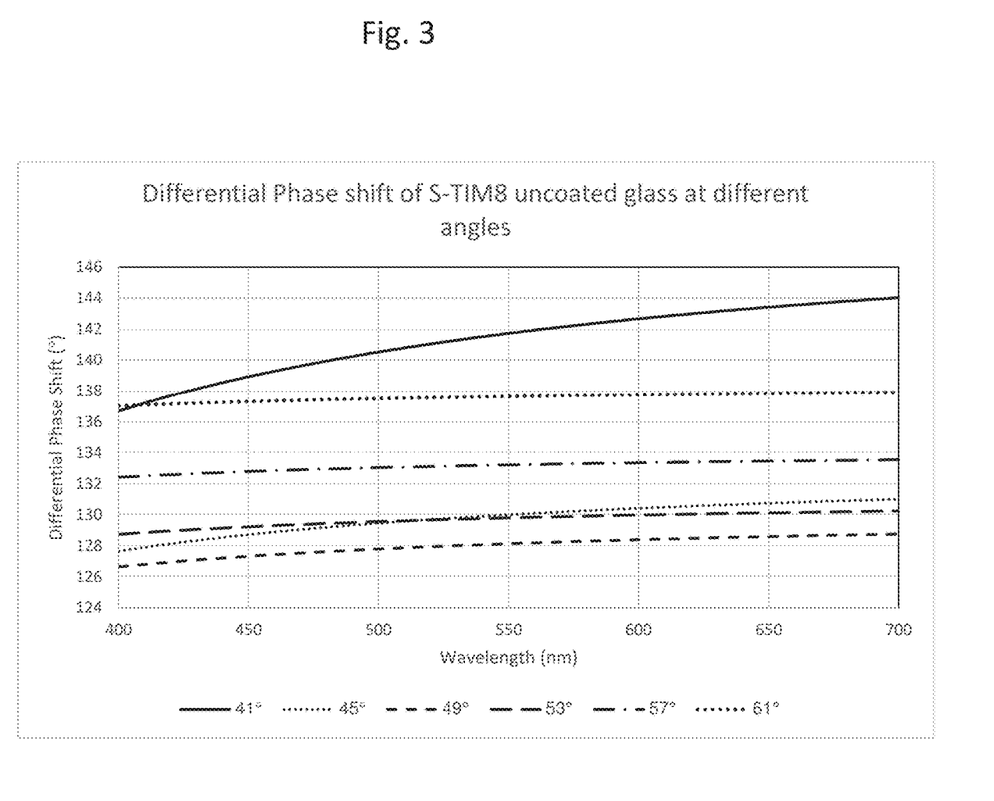
FIG. 3 illustrates a graph showing an example of a phase shifting performance of one surface of the LOE without the polarization scrambling coating.

FIG. 3 illustrates a graph showing the phase shift performance of an LOE without the polarization scrambling coating. In this case, the LOE is made from of S-TIM8 glass (n≈1.596) without coating 42 applied to the external surfaces. As shown, the phase shift is nearly constant for all wavelengths in the visible spectrum. This is undesirable, as will be described below.

Figure 4A:
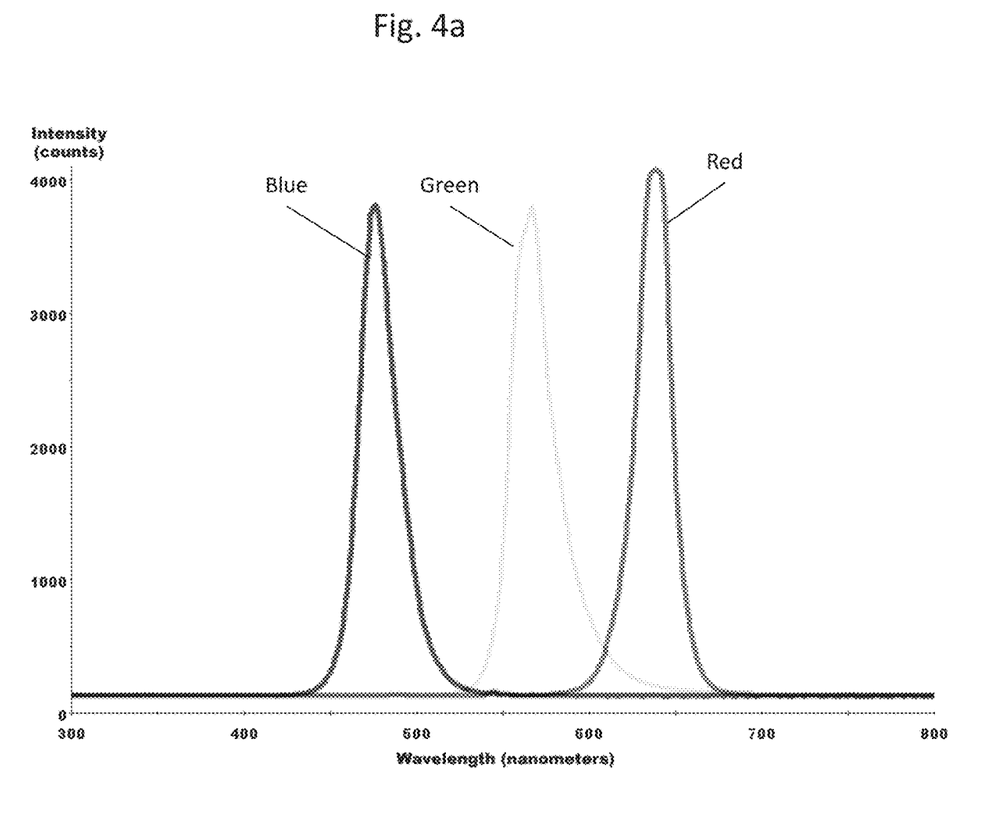
FIG. 4a illustrates a graph showing the high spectral peaks of RGB light.
Figure 4B:
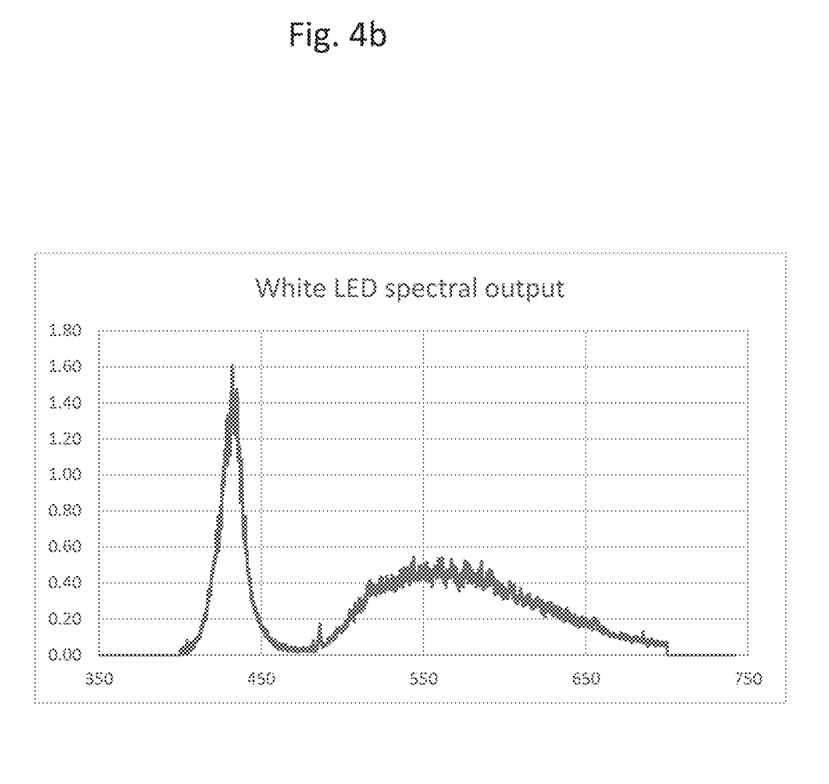
FIG. 4b illustrates a graph showing the high spectral peaks of white light.

Typically, the light entering the LOE is either from a RGB LED or white LED. FIG. 4a illustrates a graph showing the high spectral peaks of RGB light, where the phase shift slope enhancements should preferably occur. FIG. 4b illustrates a graph showing the high spectral peaks of white light, where the phase shift slope enhancements should preferably occur.

Figure 5:
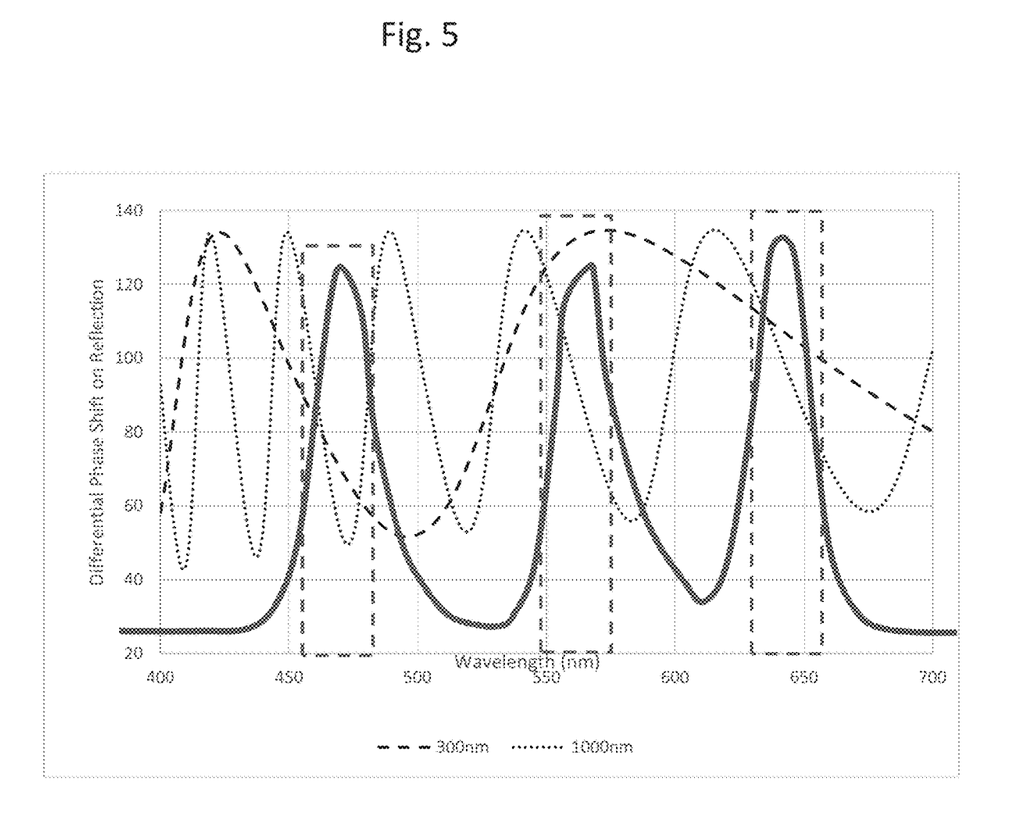
FIG. 5 illustrates a graph showing an example of a spectral differential phase shift performance of a polarization scrambling coating applied to a substrate.

FIG. 5 illustrates a graph showing an example of the phase shift caused by polarization scrambling coating 42 applied to a substrate in reference to the spectral peaks of a RGB LED light. In this case, the coating 42 is comprised of $TiO_2$, and was applied to a substrate 34 made of S-TIM8 glass. FIG. 5 shows the results of two different thicknesses of coating 42, i.e. 300 nm and 1000 nm, respectively. As shown in FIG. 5, as the thickness of the layer is increased, the slope of the phase change in the visible wavelengths becomes larger. The spectral areas where the highest depolarization and slope should take place are indicated by dashed squares, and correspond to the spectral peaks of RGB LED.

As shown in FIG. 5, a small change in the wavelength of the light entering the LOE produces a large change in the phase shift. This is compared to the spectral range of the LED emission that illuminates the system. The polarization scrambling coating 42 causes different degrees of phase shift to parts of the narrow spectral peaks (at ≈480 nm, ≈580 nm and ≈640 nm for the RGB LED, and ≈443 nm for the white LED). Since the human eye integrates the intensity of the light of close wavelengths, this effect is comparable to viewing unpolarized light. The depolarization after the reflection is partial. Since the light is reflected by the external surfaces multiple times before being reflected by the facets 22, the accumulated depolarization of the light rays is relatively high.

Figure 6:
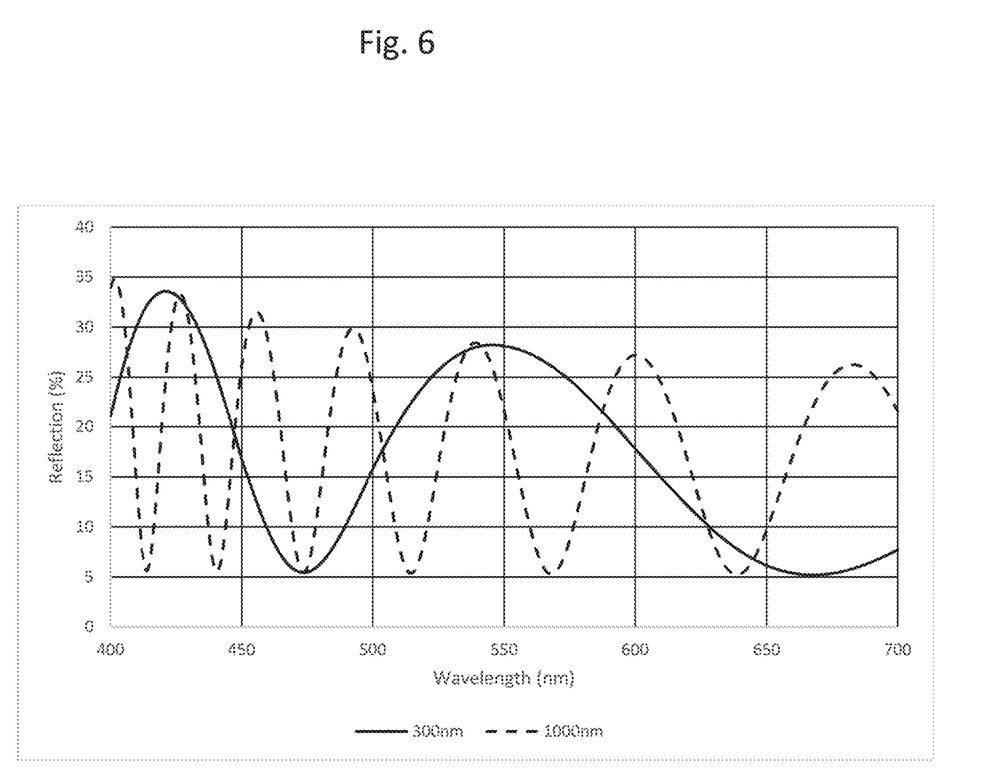
FIG. 6 illustrates a graph showing reflective properties of an exemplary polarization scrambling coating without an AR coating at normal incidence.

FIG. 6 illustrates a graph showing reflective properties of an exemplary polarization scrambling coating 42 without an AR coating 44. In this case, coating 42 was applied at two different layer thicknesses, 300 nm and 1000 nm, respectively. As shown, coating 42 tends to be highly reflective (average of about 20% per side in the visible wavelengths), causing undesirable attenuation of the view of the outside world through the LOE.

Figure 7A:
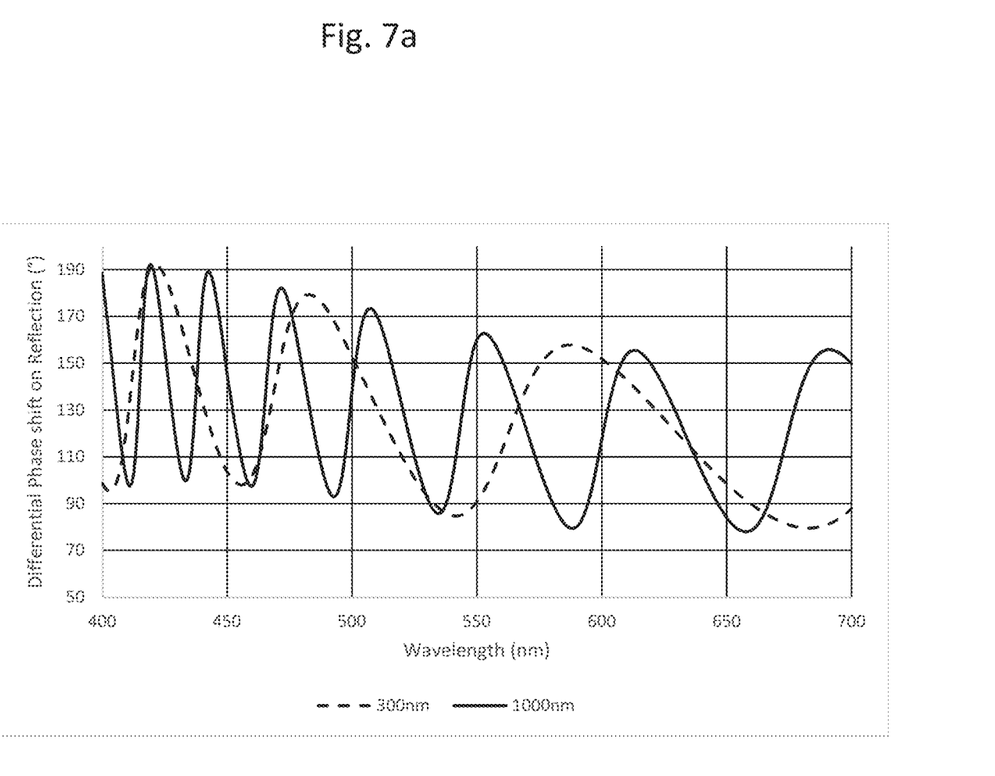
FIG. 7a illustrates a graph showing an example of a differential phase shift on reflection of light reflected by an LOE surface for rays in TIR.

FIG. 7a illustrates a graph showing an example of a differential phase shift on reflection of light entering a LOE of the present invention. In this case, the substrate is coated with a polarization scrambling coating 42 comprised of a thick $TiO_2$ layer, and an AR coating 44 on top of the polarization scrambling coating. The graph shows differential phase shift on reflection of light entering the LOE at angles of incidence of 55 degrees, in the visible wavelengths, for two different thicknesses of coating 42, i.e. 300 nm and 1000 nm, respectively.

Figure 7B:
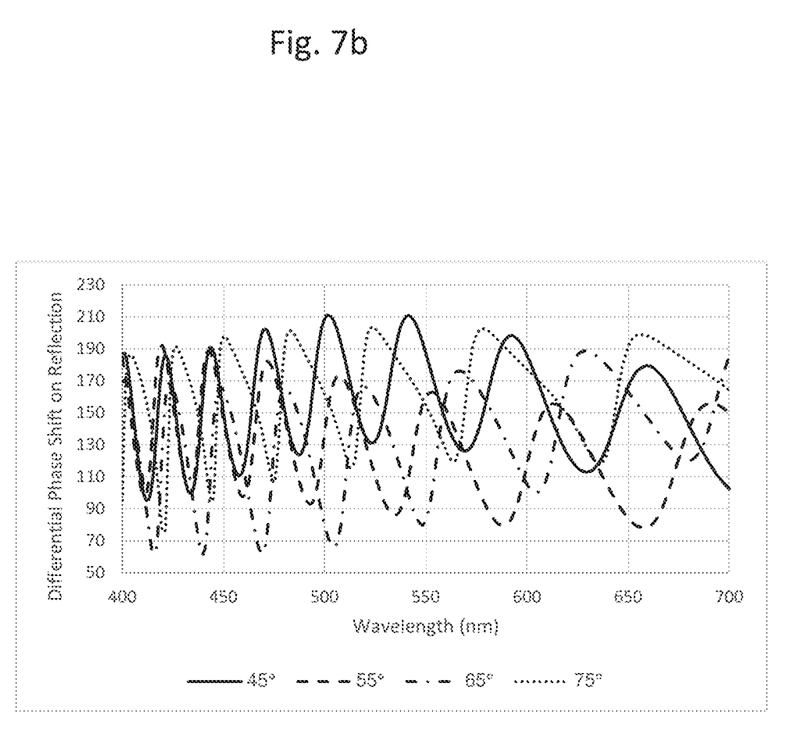
FIG. 7b illustrates a graph showing examples of differential phase shift on reflection for a variety of different angles in the TIR region.

FIG. 7b illustrates a graph showing the phase shift on reflection using the same coatings as in FIG. 7a, with coating 42 applied in a thickness of 1000 nm, for a variety of different angles in the TIR region.

Figure 8:
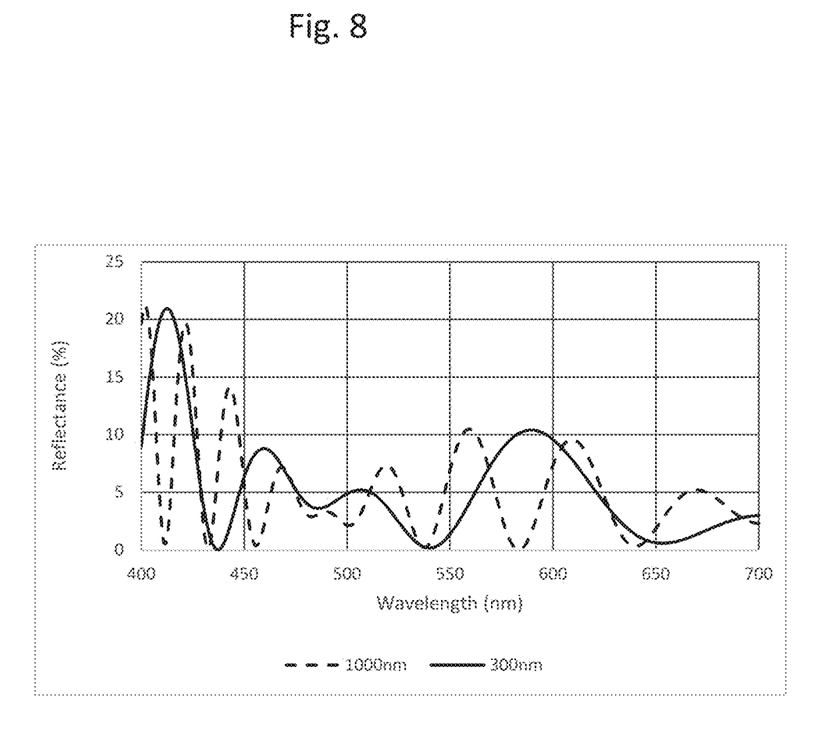
FIG. 8 illustrates a graph showing an example of reflections at normal incidence with the polarization scrambling coating and AR coating.

FIG. 8 illustrates reflections at normal incidence of a coating of consisting of layers of coating 42 (300 nm and 1000 nm $TiO_2$ layer thicknesses) and coating 44 as in FIG. 7a at different wavelengths in the visible spectrum. As shown in FIG. 8, this coating performs as an AR coating at small angles, where it is apparent that the reflection is greatly reduced compared to FIG. 6 (from about 18% average in the visible spectrum to about 4%). Using different designs and layer material this reflection can be reduced even lower.

It should be noted that the thickness of coating 42 need not be identical for both external surfaces. Rather, different thicknesses of coating 42 could be applied to the different surfaces in in order to give each side of the LOE different slopes of phase change for any spectral region. For example if on one side the LOE has a small slope of phase change for a certain wavelength, the coating on the other side may randomly fall on a large slope of phase change, where the accumulated phase shift will be large.

Needless to say, if an incoming beam of light is polarized parallel or perpendicular to the facets 22, the coating 42 will have no effect on the phase of the beam.

As stated above, the polarization scrambling coating 42 can be applied to only a portion of one or both external surfaces, instead of the entire surface.

In some cases, it may be desirable for the LOE to be coated on one external surface, or a portion thereof, with a metallic coating. In that case, the polarization scrambling coating 42 can be added between the substrate and the metallic layer, which will increase the phase shift change over the spectral region.

Figure 9:
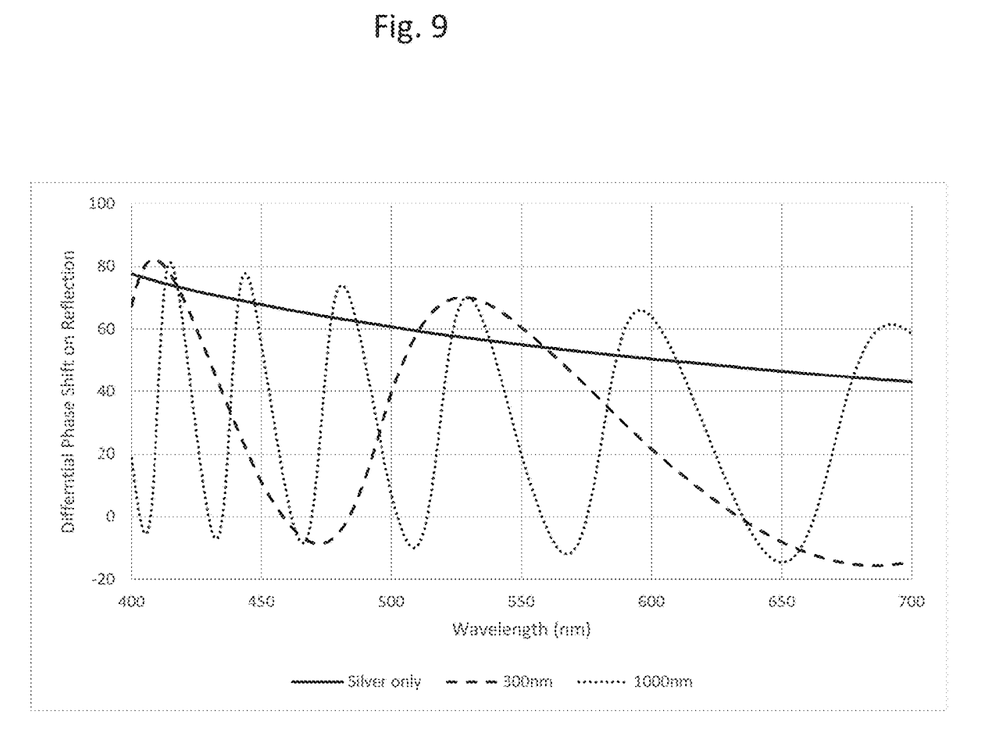
FIG. 9 illustrates a graph showing an example of reflections of the polarization scrambling coating applied between the substrate and a metallic coating.

FIG. 9 illustrates a graph showing an example of reflections of the polarization scrambling coating 42 applied between the substrate and a metallic coating. The graph shows reflections of light at a 550 angle of incidence, at different wavelengths in the visible spectrum. The graph demonstrates the phase shift slopes without the polarization scrambling coating 42, as well as with layer 42 at different thicknesses, 300 nm and 1000 nm.

It should be noted that in some cases, the rays entering the LOE may not be in the same plane of the drawing, i.e. entering the LOE at another three dimensional angle. In this case even if the beam is polarized, it will not be polarized in reference to the TIR planes. Therefore, it will change the polarization state of the reflected beam and can be treated as unpolarized light.

Figure 10:
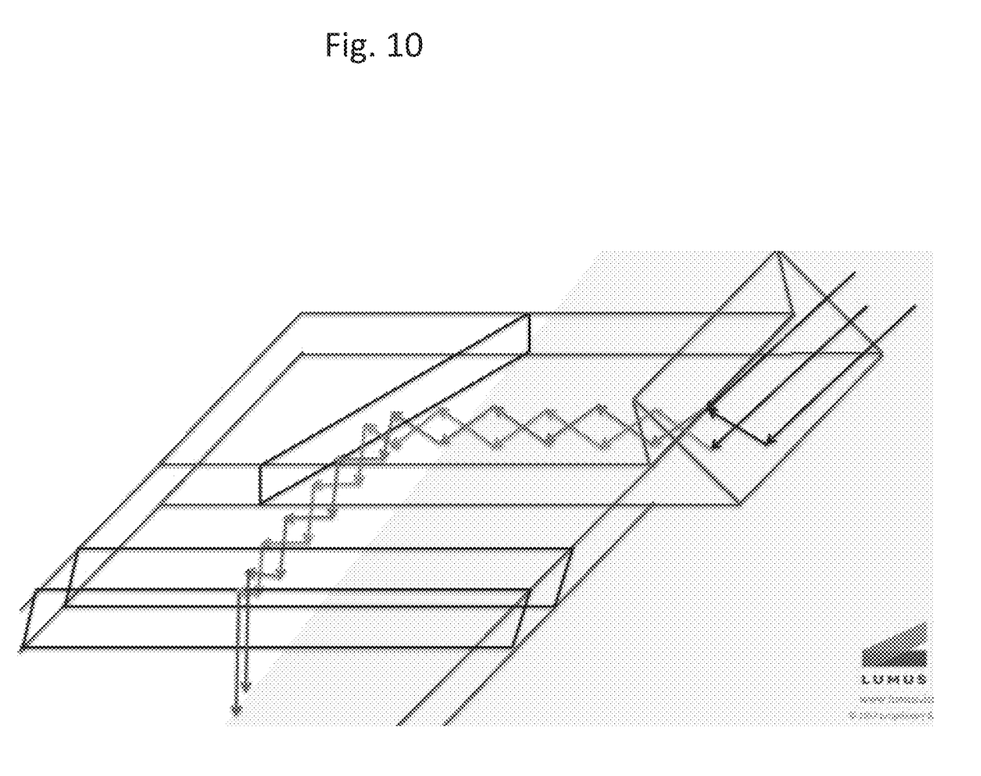
FIG. 10 illustrates an embodiment of display system with two waveguides.

FIG. 10 illustrates a display system having two LOEs, in which the beam is reflected from one LOE at an arbitrary angle to the second LOE. This reflection introduces a phase shift that will therefore change the polarization state of the beam so it will not be polarized upon reflection from the facets. Here again, the coating 42 applied to the LOE surface will make sure that the reflection from the facets will not be dependent on the polarization state of the beam.

Figure 11:
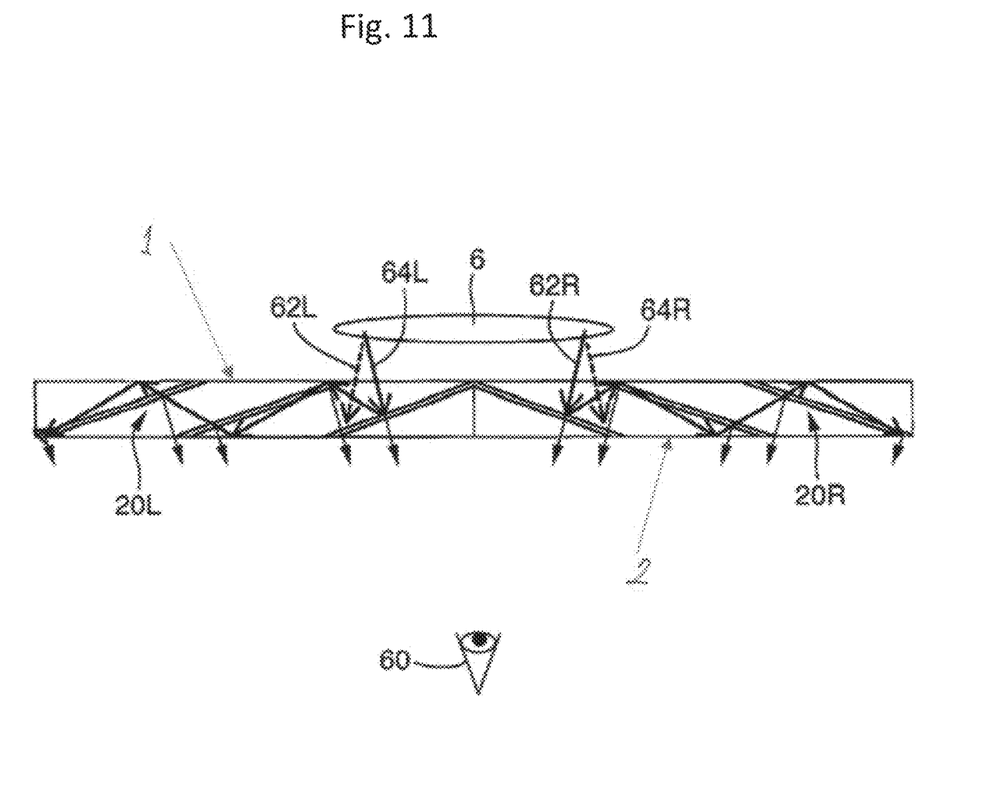
FIG. 11 illustrates another embodiment of an LOE according to the present invention.

FIG. 11 illustrates another embodiment of an LOE according to the present invention. In this embodiment, the LOE is designed for light beams to enter at the center of the waveguide and propagate towards each opposite end. In this case, the incoming beam travels through a converging lens 6. Rays 64L and 64R pass through the LOE. The beams to the eye will either be transmitted through the center facets, or will be reflected by the central facets and travel to the side and reflected towards the eye by the other facets. Traveling from the central facets to the side facets, the rays encounter TIR from surfaces 1 and 2. Therefore, surfaces 1 and 2 should also be coated with the polarization scrambling coating 42 (and optionally one or more layers of AR coating 44) for depolarizing the beams, since the next reflecting facets are designed for unpolarized light. Here again, the addition of AR layers will increase the transmittance of surfaces 1 and 2.

It should be appreciated that embodiments of the presently described LOE can be implemented in a large number of imaging applications, such as head-mounted displays (HMDs) and head-up displays (HUDs), cellular phones, compact displays, 3-D displays, compact beam expanders, as well as non-imaging applications, such as flat-panel indicators, compact illuminators and scanners.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A lightguide optical element (LOE) configured for polarization scrambling comprising:
   a transparent substrate having a first refractive index, the substrate comprising a pair of parallel external surfaces configured to propagate light within said LOE through total internal reflection (TIR), and a plurality of mutually parallel partially reflective internal surfaces, said plurality of mutually parallel partially reflective internal surfaces being non-parallel to the pair of parallel external surfaces and configured to couple out said light to a viewer;
   a first coating having a thickness between 100 nm and 10 microns on at least one external surface of the substrate, the first coating comprising a coating material having a second refractive index higher than said first refractive index; and
   an antireflective (AR) coating on at least one external surface of the substrate over said first coating,
   wherein the first coating is configured to increase a phase shift between s-polarized and p-polarized components of light incident at angles of above TIR having a wavelength between 400 nm and 1300 nm.

2. The LOE of claim 1, wherein said AR coating is configured to reduce or eliminate reflections of light entering the LOE at angles of incidence between 0° and 50°.

3. The LOE of claim 1, wherein said AR coating is configured to reduce reflections of light entering the LOE at predetermined angles to between 0.3% and 10% reflected light.

4. The LOE of claim 1, wherein said first coating comprises a high index dielectric material.

5. The LOE of claim 4, wherein said first coating comprises a material selected from the group consisting of $TiO_2$, $Si_3N_4$ and ZnS.

6. The LOE of claim 1, wherein said AR coating comprises one or more layers of at least one coating material selected from the group consisting of $SiO_2$, $HfO_2$, $TiO_2$, $MgF_2$ and $Al_2O_3$.

7. The LOE of claim 1, wherein said AR coating comprises one or more layers of at least one material having a refractive index in the range of 1.35 to 2.5.

* * * * *